United States Patent [19]

Sanghera et al.

[11] Patent Number: 5,364,434
[45] Date of Patent: Nov. 15, 1994

[54] PLASMA TREATMENT OF GLASS SURFACES TO REMOVE CARBON

[75] Inventors: Jasbinder S. Sanghera, Greenbelt, Md.; Pablo C. Pureza, Burke; Ishwar D. Aggarwal, Fairfax Station, both of Va.

[73] Assignee: The United States of America as represented by the Secretary of the Navy, Washington, D.C.

[21] Appl. No.: 953,390

[22] Filed: Sep. 30, 1992

[51] Int. Cl.$^5$ ............................................. C03C 23/00
[52] U.S. Cl. ..................... 65/30.1; 156/643; 65/31; 65/DIG. 16
[58] Field of Search ................. 65/30.1, 31, DIG. 16, 65/134, 60.6; 156/643

[56] References Cited

U.S. PATENT DOCUMENTS

| | | | |
|---|---|---|---|
| 4,810,054 | 3/1989 | Shinbori et al. | 350/96.21 |
| 4,898,777 | 2/1990 | Kindler | 65/31 |
| 5,000,771 | 3/1991 | Fleming, Jr. | 65/23 |
| 5,055,120 | 10/1991 | Tran | 65/DIG. 16 |
| 5,106,402 | 4/1992 | Geittner | 65/3.12 |

FOREIGN PATENT DOCUMENTS 2038311 7/1980 United Kingdom ......... 65/DIG. 16

OTHER PUBLICATIONS

Klein et al., "Strengthening of Zblan Glass Fibers by Preform Treatment with Active Fluorine", Printed in Materials Science Forum, vols. 32-33, (1988), pp. 571-576.

Primary Examiner—W. Gary Jones
Assistant Examiner—John Hoffmann
Attorney, Agent, or Firm—Thomas E. McDonnell; George A. Kap

[57] ABSTRACT

Glass free of surface carbon deposits, such as carbon film and/or carbon occlusions, and a process for removing such carbon deposits from glass. The process is characterized by the application of a plasma to glass to remove the carbon deposits. The plasma used for this purpose contains active specie which reacts with the carbon deposits to form gaseous carbon products.

13 Claims, 1 Drawing Sheet

PLASMA TREATMENT OF GLASS SURFACES TO REMOVE CARBON

FIELD OF INVENTION

This invention pertains to plasma treatment of glass surfaces in order to remove carbon contamination.

BACKGROUND OF INVENTION

In reference specifically to optical fibers made from preforms, optical fibers made from heavy metal fluoride glass, such as $ZrF_4$-based glasses, possess a theoretical minimum attenuation of about 0.01 dB/km at around 2.5 $\mu$m. This is over an order of magnitude lower than the 0.15 dB/km obtained for silica based optical fibers. While short lengths of the fibers made from heavy metal fluoride glass have demonstrated losses approaching theoretical values, fibers longer than 100 m exhibit losses of about 1 db/km. The main reason for this is due to scattering of light from defects such as crystals and bubbles and also particles of crucible material from crucibles used for melting the glass components.

Glass, particularly halide-containing glass, is made by melting high purity glass components in vitreous carbon crucible under an oxidizing gaseous atmosphere. In the case of heavy metal fluoride glass, the melting temperature is about 850° C., the gaseous atmosphere is a $SF_6N_2$ gas mixture, and duration of the melting processing in the gaseous atmosphere is about 2 hours. This melting schedule produces zero crystal growth on subsequent heat treatment of the glass and the resulting glass has an extremely low hydroxyl (OH) concentration of less than 3 ppb.

Unfortunately, the use of vitreous carbon crucibles in glass manufacture is deleterious when used to cast fiber preforms due to carbon contamination from the crucible walls above the melt surface. Although such preform melts are initially made in carbon crucibles, they are quenched and the glass is then remelted in platinum crucibles under an oxidizing atmosphere of $O_2/N_2$ gas mixture and subsequently cast into preforms for fiber drawing. The oxidizing atmosphere removes a substantial portion of carbon as gaseous $CO_2$, however, at least some of the carbon remains. It has been observed, however, that some crucibles leave a carbon film and carbon occlusions in sporadic regions on the glass surface. This occurrence is more prevalent in new crucibles which usually exhibit passivation after several melt schedules. However, some crucibles persistently give this problem of undesired carbon deposition.

During remelting of the glass, the undesired carbon deposition is introduced into the bulk of the glass producing carbon occlusions in the preforms or whatever is made from the glass. Subsequent remelting, drawing or any reshaping of the glass, leads to undesirable crystallization if impurities or imperfections are present in the glass. It has been determined that loss per 1 micron in diameter carbon particle is about $2.8 \times 10^{-4}$ dB.

Carbon contamination can take place in the crucible in which the glass is made. During cooling of the melt in the crucible, certain regions of the crucible adhere to the side walls of the glass as the glass cools and contracts in volume. The carbon particles that chip off and find their way into preforms from which optical fibers are drawn are on the order of about 1 micron. On remelting the glass, the carbon particles are incorporated into the bulk and lead to a source of scattering in the preform and fibers made therefrom.

The known techniques for removing carbon film and carbon particles include (1) grinding and polishing the glass surface (2) chemically etching the glass surface, and (3) grinding, polishing and then etching the glass surface. These techniques are inappropriate because grinding leaves behind particles which cause light scattering and chemical etching causes water contamination leading to an increase in the OH peak absorbance.

SUMMARY OF INVENTION

It is an object of this invention to make glass articles free of carbon deposits.

It is another object of this invention to remove carbon deposits from glass articles at a low temperature and a subatmospheric pressure.

It is another object of this invention to make fluoride glass with no carbon deposits, reduced crystallization, and no trapped bubbles.

These and other objects of this invention can be accomplished by contacting glass that has a carbon-containing surface with a plasma containing an active specie that reacts with the carbon to form a gaseous reaction product.

DETAILED DESCRIPTION OF INVENTION

Figure 1:
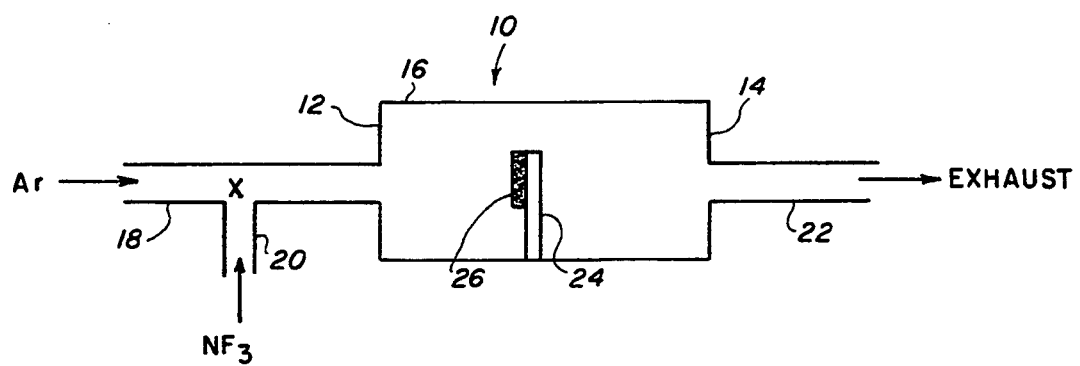
FIG. 1 illustrates the reaction chamber for removing surface carbon from glass whereby carbon film and/or carbon occlusions on the glass are removed from the glass by bringing the carbon film and/or carbon occlusions in contact with an active specie generated by plasma, which active specie reacts with carbon to produce a gaseous product.

Any glass that is made in a carbon-containing crucible or contains carbon film and/or carbon occlusions on its surface can be subject of the invention disclosed and claimed herein. Whether a glass is made in a carbon-containing crucible is not a primary concern. What is critical herein is that a glass subjected to treatment, as described herein, contain surface carbon contamination, however it was deposited or however it came about.

According to the present invention, carbon film and carbon occlusions on the surface of a glass can be removed by contacting the glass with a plasma containing an active halide specie. The active specie, e.g., active fluorine (F), combines with carbon in the manner shown below, leaving a pristine glass surface (MF):

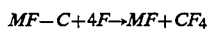

$$MF-C+4F \rightarrow MF+CF_4$$

The free energy of formation of $CF_4$ at room temperature (about 25° C.) is $-157.85$ kcal/mol and it is less at higher temperatures, indicating preference for a low temperature reaction, such as about 25° C. or about room temperature. Since $CF_4$ is a gaseous product at 25° C. and at higher temperatures, it readily volatizes to leave behind a pristine glass surface.

Plasma is generally defined as being ionized gas or a gaseous medium of charged or energetically active particles. It should be understood that the particle or active specie that reacts with carbon need not be ionized; it can be an active radical. When an atom or molecule absorbs enough energy, one or more electrons are lost and positively charged particles are formed. The particle is thus ionized and the process is called ionization. In a plasma, charged particles of an inert gas are normally present together with active specie of a reactive gas.

Plasma can be produced by microwaves, radiowaves, and by other electromagnetic energy, although generation of plasma by microwaves is more suitable for purposes herein. Microwave plasma is produced at frequencies from about 1 to 1000 GHz and temperature at the center of the microwave plasma is about 400° C. Wavelength in meters of the microwaves is in the range of about 0.001–0.1. Plasma can also be produced by radiowaves at a frequency in the range of kilohertz (kHz) from about 1 to about $1 \times 10^8$ kHz and temperature at the center of the radiowave plasma is on the order of 10,000° C. Wavelength of the radiowaves is in the range of about $0.002-1 \times 10^6$ meters. Since the temperature is so much lower, microwave plasma is preferably used herein although a plasma can be used which is generated by any means.

The energy necessary to form plasma by means of microwaves depends on many parameters, however, based on experiments conducted to remove surface carbon from fluoride glass, the microwave energy should be in the approximate range of 1 to 1000 watts, preferably 10 to 500 watts, with appropriate tickling to facilitate plasma initiation. With respect to radiowaves, the energy requirements are 0.1–100 kilowatts, preferably 0.5–20 kilowatts, and especially 1–5 kilowatts.

The plasma contains ionized or charged particles of an inert gas and ionized or active specie of a reactive gas. The charged particles of an inert gas act as a carrier for the active specie of the reactive gas and in some cases, the charged particles of the inert gas act to form the active specie by dissociating the reactive gas to form the active specie of the reactive gas. Examples of inert gases suitable herein include nitrogen ($N_2$), helium (He), neon (Ne), argon (Ar), krypton (Kr), xenon (Xe), and mixtures thereof. Examples of reactive gases from which active specie or charged particles can be produced include gaseous halogen compounds such as nitrogen trifluoride ($NF_3$), sulfur hexalfluoride ($SF_6$), carbon tetrafluoride ($CF_4$), boron trifluoride ($BF_3$), and mixtures thereof. The active specie can be any halide active specie which can react with carbon to form a gaseous product. In reference to the use of the inert gas relative to the reactive gas, the ratio of the inert gas to the reactive gas is in the range of about 20:1 to 1:1, preferably 10:1 to 2:1.

For practical reasons, plasma employed herein should be generated in a microwave oven in which a reaction chamber is positioned where the reaction between the plasma containing charged particles of the reactive gas and surface carbon on the glass is carried out. Therefore, the charged particles or the active specie of the reactive gas can be generated in one location and the reaction of carbon therewith can take place at another location inside or outside of the reaction chamber. Removal of carbon deposition can be accelerated by placing the glass object closer to the center of the plasma thus carrying the glass treatment at a higher temperature. If the temperature is too high, the glass object can soften to an undesirable degree so that it may be necessary to move the glass object further away from the plasma center toward the edge of the plasma to attain the desired carbon removal.

Duration of the plasma step should be sufficiently long to remove the carbon film and/or carbon occlusions from the glass surface. The length of the contact step should be long enough to achieve the desired transmission through the glass and in most instances, transmission of the glass desired will be transmission through pristine glass, i.e., glass without any carbon film and/or carbon occlusions therein or thereon. This duration will depend on many parameters including the desired transmission, concentration of the active specie in the plasma atmosphere, temperature and pressure in the reaction chamber where carbon removal can take place, thickness or extent of the carbon film and/or carbon occlusion, whether the method is continuous or bulk, and others. For purposes herein, however, duration of the microwave plasma step will be in the range of about 1 second to 6 hours, preferably 10 seconds to 4 hours, and more preferably 20 seconds to 1 hour. Typically, reaction to remove surface carbon deposition is generally conducted in a reaction chamber where pressure is 1–500 milli Torr, preferably 10–100 milli Torr. The low pressure is necessary to ionize inert gas.

The plasma can be generated at a remote location and passed into a reaction chamber where reaction between the active specie in the plasma and the carbon deposition takes place. The plasma can also be generated in the reaction chamber itself, with the plasma filling the volume of the reaction chamber and the temperature declining with the distance from the center of the plasma.

Glass is frequently made in carbon-containing crucibles. These crucibles can deposit carbon on surface of the glass. Carbon deposits are especially detrimental to halide—containing glass. Halide glasses are well known for use in making various glass articles, including optical preforms from which optical fibers can be drawn. The halide glasses are amorphous mixtures of halide metals and most of the metallic halides have been reported as constituents. For making of optical fibers from preforms of a halide glass, the elements Ba, Al, Na, Li, Pb, and especially Zr and/or Hf have proved to be particularly suitable. The halide component of the glass is almost always fluorine but chlorine has also been used usually as fluoride/chloride mixtures.

In a typical halide glass, zirconium tetrafluoride ($ZrF_4$) is the network progenitor which is normally used in excess of about 40 mole percent, preferably 50 to 70%. It does not form glass by itself. Hafnium tetrafluoride ($HfF_4$) can be used to at least partially replace $ZrF_4$ to reduce refractive index. The network modifiers are $BaF_2$ and NaF which function to break bonds in a glass and thus permit modification thereof. The network intermediates, which aid in building the glass structure, are $LaF_3$ and $AlF_3$. To increase refractive index of a glass, an appropriate metal halide or $PbF_2$ can be used. Examples of a suitable metal halide include sodium chloride, sodium bromide, and sodium iodide.

The major fluoride glass systems include fluorozirconates, fluorohafnates, fluoroaluminates, and fluoroindates which can be doped with a halide salt selected from chloride, bromide, iodide and mixtures of such salts. The ZBLAN glasses, denoting the first letter of the cations in the composition, are particularly suitable herein for making optical waveguides. An example of such a glass is ZBLAN glass having the following mol percent composition: 53.0 $ZrF_4$, 20.0 $BaF_2$, 4.0 $LaF_3$, 3.0 $AlF_3$, and 20.0 NaF. Other halide glasses are known comprising, in mol percent, as cations, 20–45% Al ion, 0.5–25% Zr ion and/or Hf ion, and at least one anion selected from 0–45% Ca, 0–25% Sr, 0–25% Ba, where the total of Ca ion, Sr ion, and Ba ion is 20–70%.

Other halide glass systems not based on zirconium tetrafluoride or hafnium tetrafluoride include BIZYT glasses which contain the ions Ba, In, Zn, Yb, and Th; CLAP glasses which contain the ions Cd, Li, Al, and Pb; and AZYLMCSBN glasses which contain the ions Al, Zr, Y, La, Mg, Ca, Sr, Ba, and Na.

Chalcogenide glasses, which can be treated as described herein, are characterized by the presence of sulfur (S), selenium (Se), or tellurium (Te) usually used in combination with the elements arsenic (As), germanium (Ge), or antimony (Sb). Although halide glasses and chalcogenide glasses have received a great deal of interest as potential candidates for materials transmitting in the mid-infrared region, the relatively poor chemical durability of halide glasses together with their low glass transition temperatures, especially for non-fluoride halide glasses, pose serious problems for practical application. Chalcogenide glasses, on the other hand, are well known for their high chemical durability and infrared transmittance but their relatively high refractive indices give rise to large intrinsic losses in the mid-infrared region. Another family of infrared transmitting glasses are prepared from mixtures of halide and chalcogenides and are referred to as chalcohalides which have some beneficial characteristics of both glasses.

The structural aspect of chalcohalide glasses is interesting from a fundamental viewpoint since chalcogenide glasses are predominantly covalent and halide glasses are predominantly ionic in character.

Although halide glasses and chalcohalide glasses are the most important classes of glasses for purposes herein, the invention herein applies to any glass. Eamples of binary metal halide glasses include glasses such as zinc chloride ($ZnCl_2$) and silver chloride ($AgCl_2$) glasses, and binary glasses such as tellurium dichloride ($TeCl_2$) and tellurium sesquichloride ($Te_3Cl_2$) glasses. The binary Te-Cl system can be extended to include sulfur (S) and systematic replacement of chlorine by bromine and iodine yields ternary glasses.

Low melting and high melting oxide glasses can also be made in carbon-containing crucibles, however, the high melting oxide glasses are particularly unforgiving to the crucibles with the result that life of such crucibles is substantially shortened.

Generally, this invention does not pertain to silica and other oxide glasses because components thereof are usually melted in precious metal crucibles, such as platinum. However, such glasses can be treated as described herein if they have surface carbon contamination.

Thickness of the carbon film and the size of the carbon occlusions on the surface of the glass that can be removed with plasma, as described herein, depends on many factors. It is estimated, however, that the thickness of carbon film which can be removed by the use of plasma is in the approximate range of 50–100,000 angstroms, preferably 100–10,000 angstroms. In the case of carbon occlusions or carbon particles which have a discontinuous surface on the glass, as compared to a carbon film which has a continuous surface on the glass and which can be removed by the use of plasma, such particles are in the approximate range of 0.1–100 $\mu$m, preferably 0.2–50 $\mu$m. The extent of carbon removal from the glass surface should be about 100% which corresponds to the transmission of the glass with no carbon contamination on the glass surface and it should be sufficient to achieve the desired optical transparency or transmission through the glass. In a preffered embodiment, plasma treatment of the glass surface to remove carbon contamination or carbon deposition should be sufficient to achieve 40–80% transmission through the glass.

EXAMPLE

In a specific embodiment of the method for removing carbon films and/or carbon occlusions, upper half of a planar fluoride glass plates measuring 1 cm×1 cm and being 2 mm in thickness were coated with carbon using a standard SEM carbon sputtering unit. The glass plates were composed of ZBLAN glass consisting of, on mole percent basis, $53ZrF_4$-$20BaF_2$-$4LaF_3$-$3AlF_3$-$20NaF$. The carbon coating was measured to be about 1400 angstroms in thickness using profilometry. The uv spectrum of the glass plates was recorded both before and after the application of the carbon coating. The glass plates were then placed in a tubular Teflon polymer container or reaction chamber 10 shown in FIG. 1 with the argon (Ar) and nitrogen trifluoride ($NF_3$) streams, as indicated. The tubular container was about 2 cm in outside diameter and about 4 cm in length. The thickness of the container walls was about 1 mm. The argon rate into the chamber was 40 $cm^3$/min whereas the nitrogen fluoride rate was 12 $cm^3$/min.

In FIG. 1, the tubular Teflon reaction chamber 10 had threaded end caps 12,14 which threaded into tubular wall 16 of reaction chamber 10. Argon gas was admitted into the reaction chamber via Teflon tubing 18 and nitrogen trifluoride gas was admitted into the reaction chamber via Teflon tubing 20. Exhaust gases from the reaction chamber were taken out through Teflon tubing 22. Pressure in the reaction chamber during the treatment procedure was 50 milli Torr and was maintained at that pressure whereas temperature of the glass plate before it was positioned in the reaction chamber was ambient or room temperature. Glass plate is denoted by numeral 24 and the carbon coating, by numeral 26. The argon and the nitrogen fluoride gases became mixed beyond introduction of the nitrogen fluoride gas and before entry thereof into reaction chamber 10.

The reaction chamber 10 shown in FIG. 1 was disposed in a microwave oven rated at 2.45 GHz and operated at about 150 watts of power, at 110 volts. Although the gases were mixed before they entered the reaction chamber, it was only argon that was ionized by the microwave energy of the oven after being tickled or initiated. Nitrogen trifluoride became ionized by the action of the ionized argon particles. Nitrogen fluoride did not ionize at the operating conditions by itself. The plasma gas, containing charged particles of argon and active fluorine specie, occupied the entire reaction chamber. The hottest spot in the reaction chamber is marked by the letter "X" which marks the approximate center of the plasma where temperature was about 400° C. The point marked "X" was about 15 cm from the edge of the reaction chamber. The outside of the Teflon tubing and the Teflon reaction chamber were cooled by blowing air on it. The air was blown directly onto the surface where $NF_3$ was introduced into the plasma.

In carrying out this investigation, the glass plates were initially placed in the center of the plasma marked by letter "X", but this led to slumping and crystallization of the glass plates due to overheating. To avoid these problems, the glass plates were then placed further away from the center of the plasma and closer to the exhaust port. Although crystallization of the glass plates did not occur here, the reaction rates were too quick to measure. The glass plates were finally placed at the edge of the plasma and close to the exhaust port in order to gain kinetic data.

The initial or uncoated glass plate had a transmission of about 80% at 350 nm, however, the carbon coating reduced transparency to only 13% at 350 nm. After each exposure period of bout 20 minutes, transparency increased and eventually returned to the original value of about 80% for the uncoated glass plate. After 53 minutes of exposure time, transmission was about 45% at 350 nm wavelength, and after 143 minutes of exposure time, transmission increased to about 55% at the wavelength of 350 nm. The initial transmission of about 80% was reached at exposure time of about 233 minutes, measured at the wavelength of 350 nm, without any attack on the fluoride glass. At the edge of the plasma in the reaction chamber, the temperature was above room temperature but below about 100° C. The distance between "X" and the edge of the plasma where the sample was placed was about 5 cm.

As was observed, the plasma treatment removed the carbon coating without any apparent attack on the glass. The latter observation or conclusion is evident from the transmission curve since transparency levelled out at the value of the original uncoated glass plate.

As was already noted, when placed at about the center of the plasma, the glass plates slumped and crystallized due to higher temperature at the center of the plasma than at the edge thereof. There is another additional reason for slumping and crystallization of the glass plates—increased concentration of active fluorine at the center of the plasma and the exothermic nature of the reaction between active fluorine and carbon. If it is desired to remove carbon more rapidly without slumping or crystallization by the dry etch technique used herein, one would place the glass between the center and the edge of the plasma.

The invention disclosed herein may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A process for making a glass article comprising the steps of melting glass components of a glass composition in a crucible made from carbon-containing material to form melted glass, cooling said melted glass to a temperature below a glass transition temperature of said glass composition to form a glass article which contains carbon, and contacting the glass article with a plasma containing an active species which reacts with at least a portion of the carbon to form a gaseous reaction product.

2. The process of claim 1 wherein the carbon is on the surface of the glass article and wherein said process further includes the step of generating the plasma.

3. The process of claim 2 including the step of introducing a reactive gas into the plasma, and wherein said contacting step comprises contacting the plasma and the carbon on the surface of the glass article, such being carried out with the active species of the reactive gas.

4. The process of claim 3 wherein the active species comprises a halogen and said contacting step has a duration of 10 seconds to 4 hours; and the carbon on the surface of the glass article is selected from the group consisting of a carbon film of 50–10,000 angstroms in thickness, carbon particles of 0.1–100 microns in diameter, and mixtures thereof.

5. The process of claim 4 including the step of introducing the plasma into a reaction chamber having a surface that is inert to the plasma, said contacting step taking place inside the reaction chamber while the glass article is at a temperature below a glass transition temperature of said glass article, the interior of the reaction chamber being at a pressure in the range of 10–100 milli Torr, and the glass composition is a fluoride glass.

6. A process for removing carbon from the surface of a glass article comprising the steps of contacting the glass article with a plasma generated by microwave energy and taking out the glass article free of carbon on its surface from the plasma, the plasma comprising an active species that reacts with carbon to form a gaseous reaction product.

7. The process of claim 6 wherein said contacting step takes place inside a reaction chamber having inner surfaces that are inert to the plasma, duration of said contacting step is 1 second to 6 hours, and pressure in said reaction chamber is in the range of about 1–500 milli Torr.

8. The process of claim 7 wherein said contacting step occurs while the glass article is at a temperature below a glass transition temperature of said glass article, and the plasma comprises charged particles of at least one inert gas.

9. The process of claim 7 wherein said plasma comprises charged particles of an inert gas, and comprising the steps of introducing a reactive gas into said plasma and contacting carbon on the surface of the glass article with the plasma.

10. The process of claim 9 wherein the glass composition is a halide glass, the inert gas is selected from the group consisting of nitrogen, helium, argon, neon, krypton, xenon, and mixtures thereof; and the reactive gas is selected from the group consisting of nitrogen halide, sulfur halide, carbon halide, boron halide, and mixtures thereof.

11. The process of claim 10 wherein the reactive gas is selected from the group consisting of sodium trifluoride, sulfur hexafluoride, carbon tetrafluoride, boron trifluoride, and mixtures thereof.

12. The process of claim 10 including the steps of feeding more of the inert gas into the reaction chamber than the reactive gas and feeding the reactive gas into the plasma to form said active species.

13. The process of claim 10 wherein the carbon on the surface of the glass article is selected from the group consisting of carbon film of 50–100,000 angstroms in thickness, carbon particles of 0.1–100 microns in diameter, and mixtures thereof; the glass article is at a temperature of between about room temperature and 100° C. when it is reacted with the active species; said inert gas is argon; said reactive gas is nitrogen trifluoride; said plasma comprises charged argon particles and active fluorine species; reactive gas has a relative ratio of argon gas to nitrogen trifluoride gas of about 3:1; said reaction chamber is at a pressure of about 50 milli Torr; the glass composition is ZBLAN glass; and the glass article is placed in the reaction chamber at a point away from the hottest point of the plasma so that said glass article does not slump or crystallize.

* * * * *